US012716487B2

(12) United States Patent
Krishnamurthy

(10) Patent No.: US 12,716,487 B2
(45) Date of Patent: Aug. 25, 2026

(54) CONTROL METHOD AND CONTROL DEVICE FOR A VEHICLE GEARBOX

(71) Applicant: ZF CV Systems Europe BV, Brussels (BE)

(72) Inventor: Karthick Krishnamurthy, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 0 days.

(21) Appl. No.: 19/097,955

(22) Filed: Apr. 2, 2025

(65) Prior Publication Data

US 2025/0314295 A1 Oct. 9, 2025

(30) Foreign Application Priority Data

Apr. 4, 2024 (EP) .................................... 24168413

(51) Int. Cl.

| | |
|---|---|
| ***F16H 61/04*** | (2006.01) |
| ***F16H 59/40*** | (2006.01) |
| ***F16H 59/42*** | (2006.01) |
| ***F16H 59/68*** | (2006.01) |
| ***F16H 61/08*** | (2006.01) |
| *F16H 61/00* | (2006.01) |

(52) U.S. Cl.

CPC ............ *F16H 61/08* (2013.01); *F16H 59/40* (2013.01); *F16H 59/42* (2013.01); *F16H 59/68* (2013.01); *F16H 61/0403* (2013.01); *F16H 2059/405* (2013.01); *F16H 2059/425* (2013.01); *F16H 2059/6807* (2013.01); *F16H 2061/0087* (2013.01); *F16H 2061/047* (2013.01)

(58) Field of Classification Search

CPC .......... F16H 61/08; F16H 59/40; F16H 59/42; F16H 59/68; F16H 61/0403; F16H 2059/405; F16H 2059/425; F16H 2059/6807; F16H 2061/0087; F16H 2061/047

See application file for complete search history.

(56) References Cited

U.S. PATENT DOCUMENTS 5,099,711 A * 3/1992 Langbo ............... F16H 61/0403 74/335

2002/0023511 A1* 2/2002 Miyazaki ............ F16H 61/2807 74/336 R (Continued)

FOREIGN PATENT DOCUMENTS

DE 102021104101 A1 8/2022
DE 102022114826 A1 9/2022

*Primary Examiner* — Tisha D Lewis
(74) *Attorney, Agent, or Firm* — Dickinson Wright PLLC

(57) ABSTRACT

A device and method to detect and resolve a tooth-on-tooth situation of a gearbox (40) are provided. The device (20) includes at least one processing circuit (30) configured to obtain a gearbox actuator position (16) indicative of a position of an actuator member (52, 53) of a gearbox actuator (50). The at least one processing circuit (30) is configured to process the gearbox actuator position (62) to detect a tooth-on-tooth situation and to trigger a corrective procedure to resolve the tooth-on-tooth situation. The corrective procedure includes triggering, by the at least one processing circuit (30), a rotational speed pulse (67, 68) or several rotational speed pulses (67, 68) for an input shaft (45) of the gearbox (40) to resolve the tooth-on-tooth situation.

20 Claims, 10 Drawing Sheets

(56) References Cited

U.S. PATENT DOCUMENTS

| | | | | |
|---|---|---|---|---|
| 2002/0137596 | A1* | 9/2002 | Markyvech | F02D 41/023<br>477/83 |
| 2018/0180167 | A1* | 6/2018 | Peterson | B60W 50/00 |
| 2022/0227371 | A1* | 7/2022 | Lindström | B60W 30/19 |

* cited by examiner 110
112
F2
F1
111
T1
T2

CONTROL METHOD AND CONTROL DEVICE FOR A VEHICLE GEARBOX

FIELD

The present disclosure relates to a control method and a control device for a vehicle. The present disclosure relates in particular to a control method and a control device used with a gearbox actuator, a vehicle transmission system for a vehicle, and a vehicle. The present disclosure relates in particular to techniques used with a non-synchronous gearbox.

BACKGROUND

Synchronized and asynchronized gearboxes offer various advantages and benefits. A synchronized gearbox, also known as a synchromesh gearbox, is a type of manual transmission that includes one or several synchronizers that may be built into or otherwise associated with the gear system. These synchronizers help to match the rotational speed of the gears during gear shifts, which allows for smoother and easier transitions between gears. A non-synchronized gearbox, sometimes referred to as a crash gearbox, does not have synchronizers, giving rise to a simpler construction. Gear shifts in a non-synchronized gearbox can be more difficult and require more precision.

A gearbox actuator is a component that assists in performing gear shift operations, both when used with a synchronized gearbox and when used a non-synchronized gearbox. Gearbox actuators with various features and configurations are known to enhance performance and reliability. A gearbox actuator generally includes at least one actuator component, such as a pushrod and/or shift fork, that is displaceable to selectively engage a gear of the gearbox with a mating gear. There can exist situations where a relative position between the gear and the mating gear prevents full meshing engagement. It is desirable to at least assist a driver in resolving such a situation, in particular for a non-synchronized gearbox where gear shifting is often more difficult to attain.

DE 10 2022 114 826 A1 and DE 10 2021 104 101 A1 disclose techniques used with vehicles. DE 10 2022 114 826 A1 provides techniques used with a vehicle clutch. DE 10 2021 104 101 A1 discloses techniques used with a transmission system.

Thus, there is still a need in the art for enhanced control methods and devices used with a transmission system and, in particular, used with a non-synchronous gearbox.

SUMMARY

The solution of the present disclosure resides in addressing the need for an improved control method and an improved control device that at least assist a driver in detecting and/or resolving a situation in which a gear of a gearbox cannot be fully engaged with its mating gear, due to the relative angular position of the gear and the mating gear. The solution of the present disclosure resides in particular in addressing need for techniques that can assist a driver when there exists a tooth-on-tooth situation in the gearbox that prevents a gear shift from being performed successfully.

According to aspects of the present disclosure, a control method, a machine-readable instruction code, a device, a vehicle transmission system, and a vehicle are provided. Various embodiments are disclosed herein.

According to an aspect of the present disclosure, there is provided a control method for a vehicle. The control method includes obtaining, by at least one processing circuit, a gearbox actuator position indicative of a position of an actuator member (e.g., a pushrod and/or shift fork, without being limited thereto) of a gearbox actuator, wherein the actuator member is displaceable to bring a gear of a gearbox into engagement with a mating gear of the gearbox. The control method includes processing, by the at least one processing circuit, the gearbox actuator position to detect a tooth-on-tooth situation preventing engagement of the gear and the mating gear. The control method includes triggering, by the at least one processing circuit, a corrective procedure to resolve the tooth-on-tooth situation, the corrective procedure including triggering, by the at least one processing circuit, a rotational speed pulse or several rotational speed pulses for an input shaft of the gearbox to resolve the tooth-on-tooth situation.

Various effects are attained by the control method. The control method can resolve a tooth-on-tooth situation in which the relative position of the gear and the mating gear prevents full engagement, by causing a rotational speed pulse or several rotational speed pulses to be applied that cause an angular shift in the relative position of the gear and the mating gear. The control method uses the gearbox actuator position to identify the tooth-on-tooth situation, i.e., a parameter that is available from the gearbox actuator where it can be detected by a sensor or several sensors, such as one or several position encoder(s), one or several three-dimensional Hall sensor(s), or other sensing techniques. Thus, the control method assists a driver of the vehicle in handling a situation in which a gear shift is not successful, by detecting and resolving the tooth-on-tooth situation. The control method does so in an effective manner, using an input that is readily available from the gearbox actuator.

The actuator member may have a gear engagement position and a neutral position, wherein the corrective procedure may resolve the tooth-on-tooth situation without return of the actuator member to the neutral position.

Thereby, the control method can resolve the tooth-on-tooth situation without requiring a return of the actuator member (e.g., a pushrod and/or shift fork) to the neutral position. This provides time benefits and facilitates operation.

The rotational speed pulse or each of the several rotational speed pulses may respectively include a rising rotational speed flank followed by a falling rotational speed flank.

Thereby, the control method can resolve the tooth-on-tooth situation by triggering a continuous variation of the rotational speed of the input shaft, which determines the rotational speed of the gear.

The rotational speed pulse or each of the several rotational speed pulses may respectively include an intermittent increase in rotational speed of the input shaft of the gearbox followed by a decrease, such that, at the end of each rotational speed pulse, the rotational speed of the input shaft (and, thus, the rotational speed of the gear) at a pulse end of the rotational speed pulse is substantially the same as at a pulse start of the respective speed pulse.

Thereby, the control method can resolve the tooth-on-tooth situation while ensuring that, when there is a co-rotation of the gear and the mating gear at the pulse start (i.e., when the gear and the mating gear rotate with the same rotational speed at the pulse start), the gear and the mating gear also rotate at substantially the same rotational speeds at the end of the rotational speed pulse. Thus, the control method does not affect the operations expected from a driver for implementing the gear shift with respect to controlling engine output for performing the gear shift.

The corrective procedure may further include triggering, by the at least one processing circuit, a displacement of the actuator member to temporarily increase a spacing between the gear and the mating gear during the rotational speed pulse or during the several rotational speed pulses.

Thereby, the one or several rotational speed pulses may be readily applied while ensuring that there is no friction between the gear and the mating gear during the one or several rotational speed pulses. The risk of wear is thereby enhanced.

The corrective procedure may be configured such that the displacement of the actuator member causes the actuator member (e.g., the pushrod or shift fork) to be displaced to a position that is intermediate between a position of the actuator member upon detection of the tooth-on-tooth situation and the neutral position.

Thereby, the control method can resolve the tooth-on-tooth situation without returning the actuator member (e.g., a pushrod and/or shift fork) to the neutral position. This provides time benefits and allows the tooth-on-tooth situation to be resolved more quickly as compared to a return to the neutral position.

Triggering the displacement of the actuator member may include communicatively interfacing, by the at least one processing circuit, with the gearbox actuator to temporarily increase the spacing between the gear and the mating gear.

Thereby, the at least one processing circuit can control the gearbox actuator, via a direct communication link (e.g., a point-to-point communication link) or via a vehicle bus based communication, to intermittently increase the spacing between the gear and the mating gear.

The corrective procedure may further include triggering, by the at least one processing circuit, a further displacement of the actuator member to decrease the spacing between the gear and the mating gear to re-attempt engaging the gear with the mating gear.

Thereby, the re-engagement can be triggered automatically by the at least one processing circuit at the end of the rotational speed pulse or at the end of several rotational speed pulses.

The corrective procedure may include repeating triggering the displacement and triggering the further displacement until a termination criterion is fulfilled.

Thereby, the at least one processing circuit is operative to automatically undertake several attempts to re-engage the gear and the mating gear.

The termination criterion may include successful engagement of the gear and the mating gear, which may be detected by the at least one processing circuit based on the gearbox actuator position.

Thereby, the at least one processing circuit is operative to automatically undertake several attempts to re-engage the gear and the mating gear, until the relative angular position of the gear and the mating gear have changed such that the tooth-on-tooth situation does no longer prevent engagement.

The corrective procedure further may include synchronizing, by the at least one processing circuit, the further displacement with a pulse end at which the rotational speed pulse or one of the several rotational speed pulses terminates.

Thereby, the control method can resolve the tooth-on-tooth situation while ensuring that, when re-engagement is attempted, the rotational speeds of the gear and the mating gear are substantially the same as at the start of the rotational speed pulse(s). Thus, the control method does not affect the operations expected from a driver for implementing the gear shift with respect to controlling engine output for performing the gear shift.

The control method may further include obtaining, by the at least one processing circuit, a first rotational speed that is equal to or dependent on an input shaft rotational speed of the input shaft, and a second rotational speed of that is equal to or dependent on an output shaft rotational speed of an output shaft. The at least one processing circuit may obtain the first rotational speed as function of time. The at least one processing circuit may obtain the second rotational speed as function of time. The corrective procedure may be further performed based on a comparison of the first rotational speed and the second rotational speed.

Thereby, the control method can resolve the tooth-on-tooth situation taking into account the rotational speed of the gear (which depends on the rotational speed of the input shaft) and the rotational speed of the mating gear (which depends on the rotational speed of the output shaft). This allows relative rotation between the gear and the mating gear to be avoided when attempting re-engagement.

The at least one processing circuit may determine a trigger time for triggering the further displacement based on the comparison of the input shaft speed and the output shaft speed.

Thereby, the control method can resolve the tooth-on-tooth situation taking into account the rotational speed of the gear (which depends on the rotational speed of the input shaft) and the rotational speed of the mating gear (which depends on the rotational speed of the output shaft). This allows relative rotation between the gear and the mating gear to be avoided when attempting re-engagement.

Obtaining the gearbox actuator position may include obtaining the gearbox actuator position as a function of time.

Thereby, the control method can detect the tooth-on-tooth situation more reliably, based on the change in position of the actuator member (e.g., pushrod and/or shift fork) as a function of time.

Processing the gearbox actuator position may include evaluating, by the at least one processing circuit, both a magnitude of the gearbox actuator position and a time-dependent variation of the gearbox actuator position.

Thereby, the control method can detect the tooth-on-tooth situation more reliably, based on the change in position of the actuator member (e.g., pushrod and/or shift fork) as a function of time.

Processing the gearbox actuator position may include evaluating, by the at least one processing circuit, both the magnitude of the gearbox actuator position and the time-dependent variation of the gearbox actuator position to detect the tooth-on-tooth situation.

Thereby, the control method can detect the tooth-on-tooth situation more reliably, based on the change in position of the actuator member (e.g., pushrod and/or shift fork) as a function of time. This facilitates application of the technique in association with various types of gearbox actuators and/or gearboxes, without requiring a priori knowledge of the gearbox actuator position in tooth-on-tooth situation.

Alternatively or additionally, processing the gearbox actuator position may include evaluating, by the at least one processing circuit, both the magnitude of the gearbox actuator position and the time-dependent variation of the gearbox actuator position to learn which gearbox actuator position corresponds to the tooth-on-tooth situation.

Thereby, the control method can determine which gearbox actuator position corresponds to the tooth-on-tooth situation. This facilitates application of the technique in association with various types of gearbox actuators and/or gearboxes, without requiring a priori knowledge of the gearbox actuator position in the tooth-on-tooth situation.

The method may further include storing (e.g., in a non-volatile memory or storage system) data representing the gearbox actuator position that corresponds to the tooth-on-tooth situation, and retrieving, by the at least one processing circuit, the data when subsequently processing the gearbox actuator position to identify a further tooth-on-tooth position.

Thereby, reliability and/or speed of the detection of the tooth-on-tooth situation can be enhanced. For illustration, based on the knowledge of the gearbox actuator position that corresponds to the tooth-on-tooth situation (which has previously been determined onboard the vehicle in a data-driven manner), any subsequent occurrence of a tooth-on-tooth situation can be identified faster based on identifying that the gearbox actuator position has reached the position that corresponds to the tooth-on-tooth situation and the time derivative of the gearbox actuator position is zero.

Triggering the rotational speed pulse or the several rotational speed pulses may include communicatively interfacing, by the at least one processing circuit, with a motor control unit of the vehicle.

Thereby, the rotational speed pulse or the several rotational speed pulses can be triggered by using communicative interaction of the at least one processing circuit with a conventional motor control unit.

Communicatively interfacing with the motor control unit may include providing a control message or a control signal over a direct communication link (e.g., a point-to-point data connection) or over a vehicle bus to the motor control unit. Communicatively interfacing with the motor control unit may include obtaining rotational speed data or rotational speed signals from the motor control unit for use in performing the corrective procedure.

Thereby, the at least one processing circuit can utilize legacy vehicle communication techniques to trigger the rotational speed pulse(s) and/or to obtain speed data useful for determining at which point(s) in time re-engagement can be attempted.

The actuator member may include a pushrod and/or a shift fork.

Thereby, the at least one processing circuit is operative to detect the tooth-on-tooth situation based on the position of the pushrod and/or the shift fork and a time-dependent variation (e.g., a time derivative that may be determined as a discrete time derivative) of the position of the pushrod and/or the shift fork. Such positions can be readily determined by sensors of the gearbox actuator, such as one or several position encoder(s) and/or one or several three-dimensional Hall sensor(s), without being limited thereto.

The at least one processing circuit may include a processing circuit of an electronic control unit or of a motor control unit of the vehicle.

Thereby, the control method may be implemented such that it is performed using an electronic control unit configured to communicatively interface with both the gearbox actuator and the motor control unit, or integrated into another control unit of the vehicle (such as the motor control unit).

The gearbox may be a non-synchronized gearbox, i.e., a gearbox that does not have any synchronizers.

Thereby, the control method can automatically resolve tooth-on-tooth situations in types of gearbox where tooth-on-tooth situations are likely to occur and the driver is in particular need of assistance in view of the increased complexity of gear shift operations (as compared to synchronized gear boxes).

The control method may be performed automatically by the at least one processing circuit.

Thereby, the tooth-on-tooth situation can be resolved automatically.

According to a further aspect of the present disclosure, there is disclosed machine-readable instruction code including instructions which, upon execution by a programmable processing circuit, cause the programmable processing circuit to perform the method of any aspect or embodiment.

The effects attained by the machine-readable instruction code correspond to the effects discussed in association with the control method.

According to a further aspect of the present disclosure, there is disclosed a storage medium (such as a non-transitory storage medium) having stored thereon machine-readable instruction code including instructions which, upon execution by a programmable processing circuit, cause the programmable processing circuit to perform the method of any aspect or embodiment.

The effects attained by the storage medium correspond to the effects discussed in association with the control method.

According to a further aspect of the present disclosure, there is provided a device for a vehicle. The device may include at least one processing circuit configured to: obtain a gearbox actuator position indicative of a position of an actuator member of a gearbox actuator, the actuator member being displaceable to bring a gear of a gearbox into engagement with a mating gear of the gearbox; process the gearbox actuator position to detect a tooth-on-tooth situation preventing engagement of the gear and the mating gear; and trigger a corrective procedure to resolve the tooth-on-tooth situation, the corrective procedure including a rotational speed pulse or several rotational speed pulses for an input shaft of the gearbox to resolve the tooth-on-tooth situation.

Various effects are attained by the device. The device is operative to resolve a tooth-on-tooth situation in which the relative position of the gear and the mating gear prevents full engagement, by causing a rotational speed pulse or several rotational speed pulses to be applied that cause an angular shift in the relative position of the gear and the mating gear. The device uses the gearbox actuator position to identify the tooth-on-tooth situation, i.e., a parameter that is available from the gearbox actuator where it can be detected by a sensor or several sensors, such as one or several position encoder(s), one or several three-dimensional Hall sensor(s), or other sensing techniques. Thus, the device assists a driver of the vehicle in handling a situation in which a gear shift is not successful, by detecting and resolving the tooth-on-tooth situation. The device does so in an effective manner, using an input that is readily available from the gearbox actuator.

The device may be configured to perform the method according to any aspect or embodiment.

Optional features of the device and the effects respectively attained thereby correspond to the features disclosed in association with the control method.

The device may include an interface coupled with the at least one processing circuit and configured to communicatively interface the device with the gearbox actuator to obtain the gearbox actuator position, e.g., as a function of time (such as by sampling the gearbox actuator position at sampling times that may be at constant or variable intervals). The interface may be configured for communication with the gearbox actuator over a direct communication link (e.g., a point-to-point link) or over a vehicle bus.

Thereby, the device can obtain the gearbox actuator position as input for identifying the tooth-on-tooth situation and/or provide commands to the gearbox actuator to intermittently increase a spacing between the gear and the further gear before attempting re-engagement.

The device may include a further interface coupled with the at least one processing circuit and configured to communicatively interface the device with a motor control unit. The further interface may be configured for communication with the motor control unit over a further direct communication link (e.g., a further point-to-point link) or over a vehicle bus.

Thereby, the device can trigger the rotational speed pulse (s) by interfacing with the motor control unit.

The device may be configured to automatically resolve the tooth-on-tooth situation.

Thereby, assistance is provided to the driver in an effective manner.

According to a further aspect of the present disclosure, there is provided a vehicle transmission system, including: a gearbox including a gear and a mating gear; a gearbox actuator including an actuator member (such as a pushrod and/or shift fork) displaceable to bring the gear into engagement with the mating gear; and the device according to an aspect or embodiment.

Thereby, a vehicle transmission system is provided which assists a driver in gear-shift operations.

The gearbox may be a non-synchronized gearbox, i.e., a gearbox that does not have any synchronizers.

Thereby, the device is configured to automatically resolve tooth-on-tooth situations for types of gearbox where tooth-on-tooth situations are likely to occur and the driver is in particular need of assistance in view of the increased complexity of gear shift operations (as compared to synchronized gear boxes).

According to a further aspect of the present disclosure, there is provided a vehicle, including the device or the vehicle transmission system according to an aspect or embodiment. The vehicle may further include an engine configured to be coupled to the input shaft of the gearbox.

Thereby, the vehicle is equipped with the device configured to automatically resolve tooth-on-tooth situations, thereby assisting the driver.

The vehicle may be a commercial vehicle.

Optional features of the device, the vehicle transmission system, and the vehicle and the effects attained thereby correspond to the optional features and effects discussed in association with the control method.

Further embodiments and configurations are defined throughout the present disclosure, including the specification, drawings, and claims.

BRIEF DESCRIPTION OF THE DRAWINGS

These and other aspects of the present disclosure will be apparent from and further explained with reference to the embodiments described with reference to the accompanying drawings, in which.

DETAILED DESCRIPTION

Figure 1:
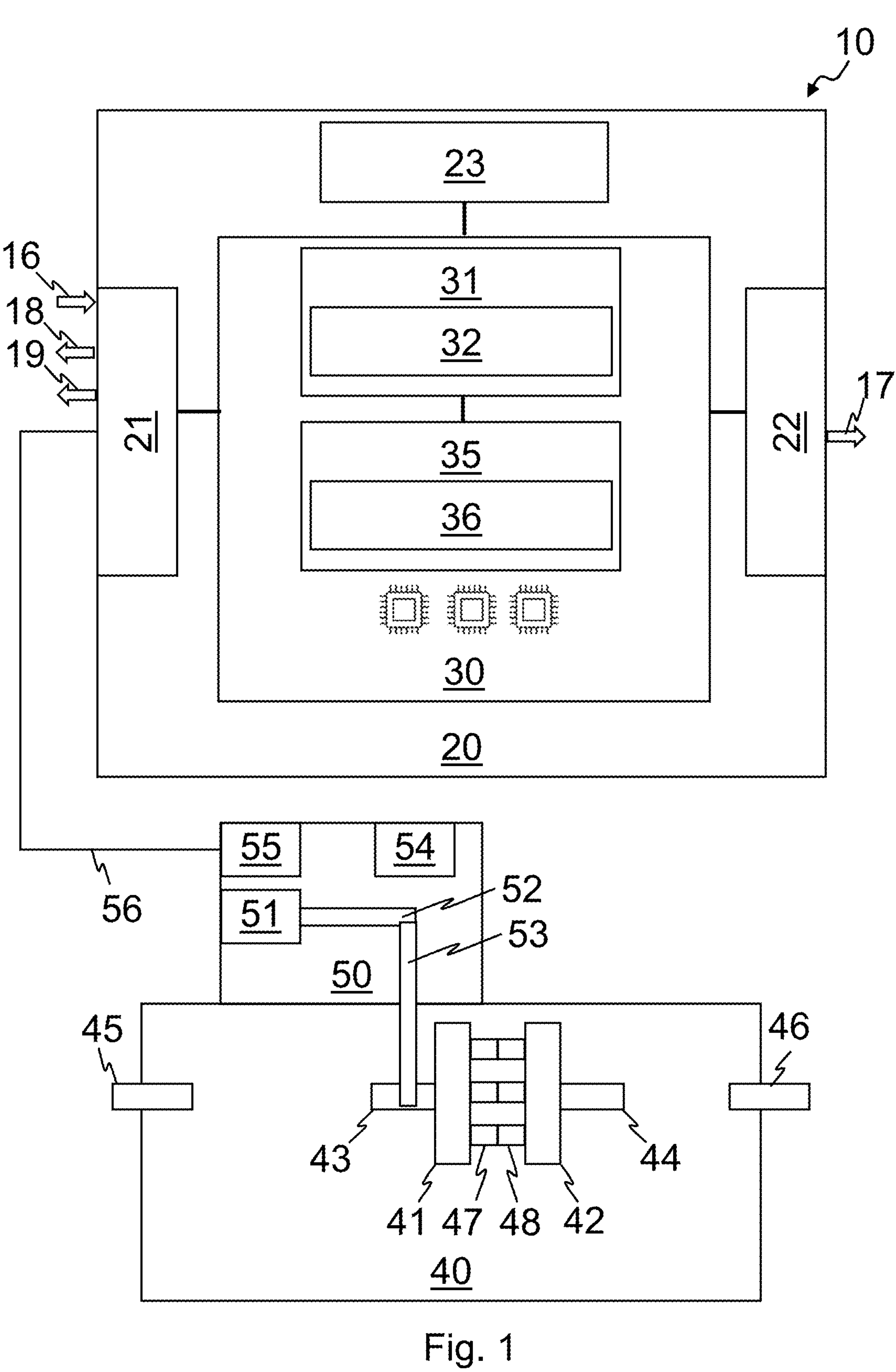
FIG. 1 is a schematic representation of a vehicle transmission system including a device according to an embodiment.

Embodiments of the present disclosure will be described with reference to the drawings. In the drawings, elements with similar or identical configuration and/or function are designated with similar or identical reference signs.

The present disclosure relates to techniques used with a gearbox actuator. As used herein, the term "gearbox actuator" refers to a component including an actuator member (such as a pushrod and/or shift fork) that is displaceable in a controlled manner to selectively bring a gear of a gearbox into engagement and/or out of engagement with a mating gear. The actuator member (such as a pushrod and/or shift fork) may be displaceable by a displacement mechanisms, such as an electric motor or a fluidic displacement mechanism, e.g., a pneumatic mechanism (e.g., a piston) and/or a hydraulic mechanism.

As used herein, "tooth-on-tooth situation" refers to an engagement in which a relative rotational position of the gear and the mating gear is such that teeth prevent full and correct mating engagement of the gear and the mating gear.

As used herein, the term "gear" encompasses a gear of a planetary gear system, of a worm gear, or other gears, without being limited thereto.

As used herein, the term "rotational speed pulse" refers to a change in rotational speed of a shaft or gear that is deliberately introduced. A rotational speed pulse may have a rising flank in which the rotational speed is increased and a falling flank in which the rotational speed is decreased, with the rising flank and the falling flank being matched to each other that the increase during the rising flank is equal in magnitude to the decrease during the falling flank. Thus, a rotational speed at the end of a rotational speed pulse may be (at least substantially) the same as the rotational speed at the start of the rotational speed pulse.

FIG. 1 shows a schematic view of a vehicle transmission system 10. The vehicle transmission system 10 includes a gearbox 40, a gearbox actuator 50, and a device 20 configured to detect and resolve a tooth-on-tooth situation.

The gearbox 40 includes a plurality of gears, including a gear 41 and a mating gear 42 with which the gear 41 is engageable. The gearbox actuator 50 is configured to place the gear 41 into and out of engagement with the mating gear 42. The gear stage including the gear 41 and the mating gear 42 includes a first shaft 43, with the gear 41 being arranged on the first shaft 43 in a torque-proof manner so as to rotate at a same rotational speed as the first shaft 43. The first shaft 43 may be integral with an input shaft 45 of the gearbox 40 or may be configured to be coupled to the input shaft 45 of the gearbox 40 (e.g., directly or indirectly via at least one intermediate gear stage). The gear stage including the gear 41 and the mating gear 42 includes a second shaft 44, with the mating gear 42 being arranged on the second shaft 44 in a torque-proof manner so as to rotate at a same rotational speed as the second shaft 44. The second shaft 43 may be integral with an output shaft 46 of the gearbox 40 or may be configured to be coupled to output input shaft 46 of the gearbox 40 (e.g., directly or indirectly via a further intermediate gear stage). As schematically illustrated, a tooth-on-tooth situation may exist in the gearbox 40 when the gearbox actuator 50 attempts to bring the gear 41 into engagement with the mating gear 42. In the tooth-on-tooth situation, a relative angular position of the gear 41 and the mating gear 42 causes one gear tooth 47 or several gear teeth 47 of the gear 41 to be located relative to one mating gear tooth 48 or several mating gear teeth 48 of the mating gear 42 that full mating engagement is blocked by the interaction of the teeth of the gear 41 and of the mating gear 42.

The gearbox actuator 50 includes an actuator member that is displaceable to bring the gear 41 into engagement with the mating gear 42. The actuator member may include a pushrod 52 and/or a shift fork 53. The shift fork 53 may be integral with the pushrod 52 or may be attached to an end of the pushrod 52. The shift fork 53 may include a bifurcated construction configured to extend on either side of the first shaft 43. The gearbox actuator 50 includes a displacement mechanism 51 configured to displace the pushrod 52 and the shift fork 53. The gearbox actuator 50 may include a sensor 54 or several sensors 54 configured to sense a position of the actuator member (e.g., the pushrod 52 and/or the shift fork 53). The gearbox actuator 50 may include a gearbox actuator interface 55 configured to provide a gearbox actuator position indicative of a position of the actuator member (e.g., the pushrod 52 and/or the shift fork 53) to the device 20. The gearbox actuator interface 55 may be further configured to receive signals or commands, via a line 56, from the device 50. The gearbox actuator 50 may be configured such that the displacement mechanism 51 causes a displacement of the pushrod 52 and shift fork 53 responsive to a command received from the device 20 via the line 56. Instead of the line 56, a bus may be provided for communication between the gearbox actuator 50 and the device 20.

The device 20 includes an interface 21 configured to communicatively interface the device 20 with the gearbox actuator 50. The device 20 may include a further interface 22 configured to communicatively interface the device 20 with a motor control unit or other vehicle control units. The device 20 may include a storage system 23, which may be configured as a non-volatile memory or storage system. The device 20 includes at least one processing circuit 30. The device 20 is configured to obtain, via the interface 21, a gearbox actuator position 16. The gearbox actuator position 16 may be obtained as signal or data in a time-resolved manner as a function of time. The at least one processing circuit 30 is configured to perform a gearbox actuator position processing 31. The gearbox actuator position processing 31 may include a detection 32 of a tooth-on-tooth situation, which may be performed based on both the gearbox actuator position 16 and a time-derivative (e.g., a discrete time derivative) of the gearbox actuator position 16. The detection 32 of the tooth-on-tooth situation may include determining which gearbox actuator position corresponds to a tooth-on-tooth situation. The at least one processing circuit 30 may be configured to store the gearbox actuator position determined to correspond to a tooth-on-tooth situation in the storage system 23. The at least one processing circuit 30 may be configured to retrieve the stored gearbox actuator position determined to correspond to a tooth-on-tooth situation when identifying, at a later time, a further tooth-on-tooth situation and performing a further corrective procedure to resolve the further tooth-on-tooth situation.

The at least one processing circuit 30 is configured to perform a corrective procedure triggering 35, responsive to detection of the tooth-on-tooth situation. The corrective procedure triggering 35 may include an output generation 36. The output generation 36 may be configured to generate a retraction triggering output 18. The device 20 may be configured to provide the retraction triggering output 18 to the gearbox actuator 50 to cause the actuator member (e.g., the pushrod 52 and/or shift fork 53) to be retracted to intermittently increase a spacing between the teeth 47 of the gear 41 and the teeth 48 of the mating gear 48. The output generation 36 may be configured to generate a rotational speed pulse triggering output 17. The device 20 may be configured to provide the rotational speed pulse triggering output 17 to the motor control unit of the vehicle. The device 20 may be configured to trigger, by generating and outputting the rotational speed pulse triggering output 17, one or several rotational speed pulses, which represent temporary changes of a rotational speed of the input shaft 45 and, thus, of the first shaft 43 on which the gear 41 is arranged. The device 20 may be configured such that the one or several rotational speed pulses change a relative angular position between the gear 41 and the mating gear 42, to thereby resolve the tooth-on-tooth situation. At the same time, the one or several rotational speed pulses may be implemented such that the rotational speed of the input shaft 45, which is controlled by the engine, and, thus, the rotational speed of the first shaft 41 and the gear 43, is at least substantially the same as at the start of the rotational speed pulse. Thus, when the rotational speed of the gear 41 and the mating gear 42 is the same when the tooth-on-tooth situation occurs, it is substantially the same at the end of the rotational speed pulse or at the end of each speed pulse. The output generation 36 may be configured to generate a re-engagement attempt triggering output 19. The device 20 may be configured to provide the re-engagement attempt triggering output 19 to the gearbox actuator 50 to cause the actuator member (e.g., the pushrod 52 and/or shift fork 53) to be displaced so as to re-attempt engaging the gear 41 and the mating gear 42, at the end of the rotational speed pulse or at the end of several rotational speed pulses.

The device 20 may be configured such that the various operations are timed such that the gear 41 is moved away from the mating gear 42 before the onset of the rotational speed pulse(s). The device 20 may be configured such that the gearbox actuator 50 is caused to re-attempt engaging the gear 41 and the mating gear 42 in a manner that is temporally coordinated with (e.g., synchronized with) a pulse end of the rotational speed pulse(s).

To perform the disclosed operations, the at least one processing circuit 30 may include any one or any combination of integrated circuits, integrated semiconductor circuits, processors, controllers, application specific integrated circuits (ASICs), field programmable gate arrays (FPGAs), circuit(s) including quantum bits (qubits) and/or quantum gates, without being limited thereto. The device 20 may be configured as an electronic control unit (ECU) that may be separate from both the motor control unit and the gearbox actuator 50. Alternatively, the at least one processing circuit 30 may be integrated with the motor control unit or the gearbox actuator 50.

The device 20 and the control method performed by the device 20 may generally be operative such that no a priori knowledge of the gearbox actuator position that corresponds to a tooth-on-tooth situation is required. The device 20 and the control method may be operative to detect a tooth-on-tooth situation by analyzing the gearbox actuator position (e.g., the pushrod and/or shift fork position) as a function of time to detect whether the pushrod 52 and/or the shift fork 53 stays at a position for a time interval, which position is different from both the gear-engagement position (or any gear-engagement position, if several gears are associated with the pushrod 52 and the shift fork 53) and a neutral position of the pushrod 52 and/or the shift fork 53. The device 20 and the control method may be configured to store the gearbox actuator position that is thus determined to correspond to a tooth-on-tooth situation, and to retrieve and use the stored gearbox actuator position when further gearbox actuator positions are obtained at a later time, processed to detect a further tooth-on-tooth situation (using the stored gearbox actuator position that has previously been determined to correspond to a tooth-on-tooth situation), and to cause the corrective procedure to be performed again (which may be implemented as explained above).

Figure 2:
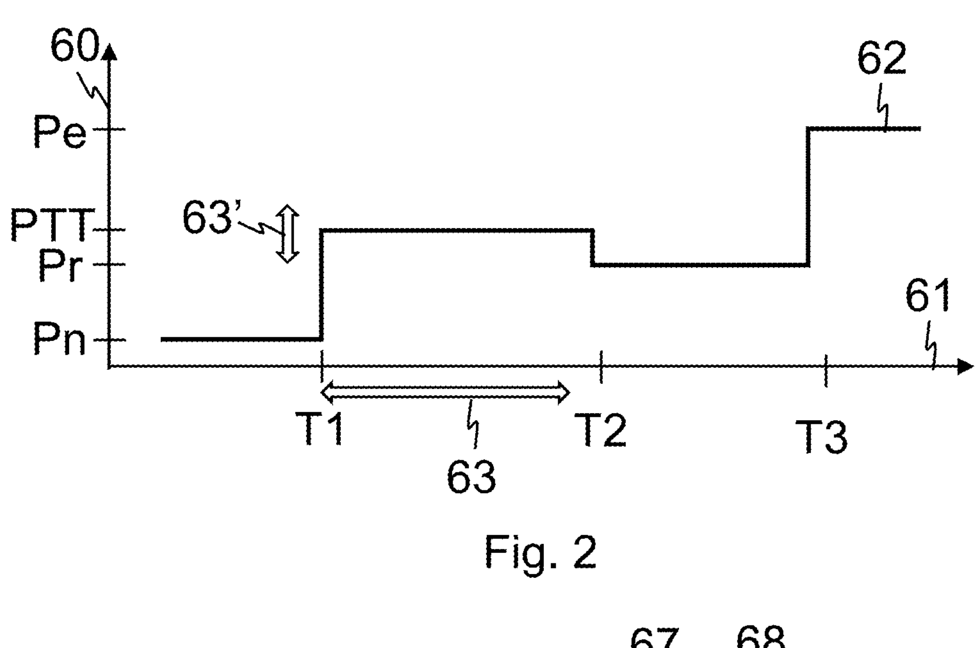
FIG. 2 is a schematic representation of gearbox actuator position as a function of time.

FIG. 2 shows a representation of a gearbox actuator position (shown along a gearbox actuator position axis 60) as a function of time (shown along a time axis 61). The gearbox actuator position 62 is indicative of a position of the pushrod 52 and/or the shift fork 53. The pushrod 52 and/or the shift fork 53 have a neutral position Pn. The pushrod 52 and/or the shift fork 53 have at least one gear-engagement position Pe. When the pushrod 52 and/or the shift fork 53 are operatively associated with several different gears of the gearbox 40, the pushrod 52 and/or the shift fork 53 may have several gear-engagement positions on opposite sides relative to the neutral position Pn. The device 20 and the control method disclosed herein are operative to detect that the gearbox actuator 50 is in a position PTT that corresponds to a tooth-on-tooth situation in the gearbox 40. The position PTT need not be known a priori (e.g., it does not need to be programmed into the device 20) but may be inherently learned in the processing of the gearbox actuator position. The processing 31 of the gearbox actuator position may include detecting that the gearbox actuator position 62 is at a value PTT that is different from the neutral position Pn and the gear-engagement position Pe, and further detecting that the gearbox actuator position 62 exhibits variations that are within a variation threshold range 63' over a time interval 63. The processing 31 of the gearbox actuator position may include detecting that the gearbox actuator position 62 is at a value PTT that is different from the neutral position Pn and the gear-engagement position Pe and that a time-derivative of the gear actuator position has a magnitude less than a threshold (e.g., that the gear actuator position remains substantially constant at the value PTT corresponding to the tooth-on-tooth situation).

As schematically illustrated in FIG. 2, the device 20 and the control method are configured such that, after a tooth-on-tooth situation occurs at a first time T1, the gearbox actuator position 62 is analyzed over the time interval 63 (which may include several gearbox actuator position sample times). At a second time T2, after the tooth-on-tooth situation has been detected, the spacing between the gear 41 and the mating gear 42 is increased. This may include effecting a displacement of the pushrod 52 and/or the shift fork 53 towards (but not up to) the neutral position. The gearbox actuator position may, thus, be controlled to revert to a retracted position Pr that is intermediate between the position PTT corresponding to the tooth-on-tooth situation and the gear-engagement position Pe. At a third time T3, after generation of one or several rotation speed pulses (FIG. 3), the gearbox actuator 50 is controlled to cause displacement of the pushrod 52 and/or the shift fork 53, to thereby re-attempt engaging the gear 41 with the mating gear 42. Due to the one or several rotation speed pulses, the tooth-on-tooth situation is resolved. The gear 41 and the mating gear 42 can be brought into engagement, with the gear 41 and the mating gear 42 rotating at (at least substantially) a same rotational speed.

Figure 3:
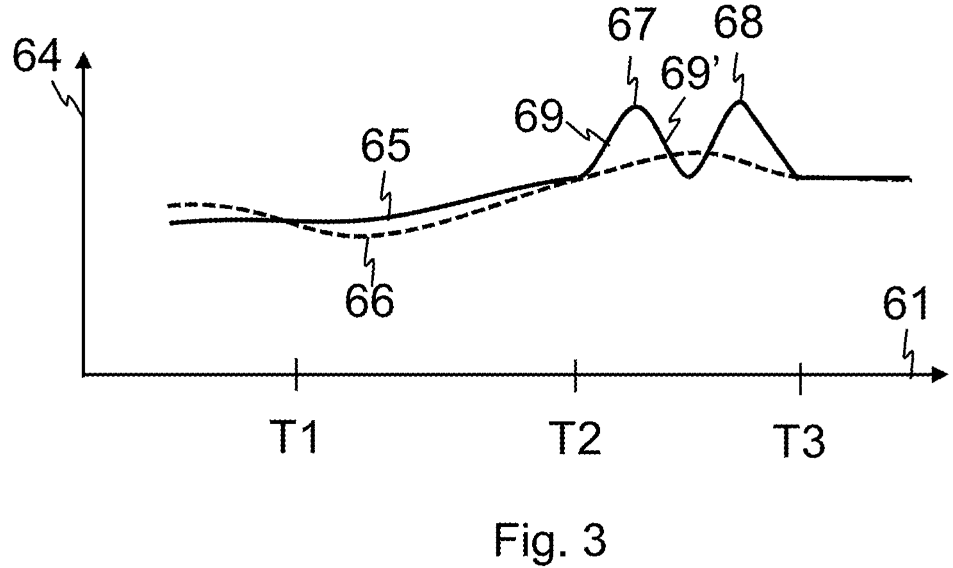
FIG. 3 is a schematic representation of a first rotational speed as a function of time and of a second rotational speed as a function of time.

FIG. 3 shows a representation of a rotational speed (shown along a rotational speed axis 60) as a function of time (shown along the time axis 61). A first rotational speed 65 may be a rotational speed of the gear 41, which is equal to the rotational speed of the first shaft 43. A second rotational speed 66 may be a rotational of the mating gear 42, which is equal to the rotational speed of the second shaft 44. The first rotational speed 65 is controllable by controlling the engine speed and, thus, the speed of the input shaft 45 of the gearbox 40. The device 20 and control method introduce, by means of an engine control, a rotational speed pulse 67 or a sequence of successive (e.g., immediately consecutive) rotational speed pulses 67, 68. Each rotational speed pulse 67, 68 may include a rising flank 69 followed by a falling flank 69'. The increase in rotational speed during the rising flank 69 may equate, at least substantially, the decrease during the falling flank 69'. The rising flank 69 and the falling flank 69' may have different durations and/or may have different flank profiles.

Figure 4:
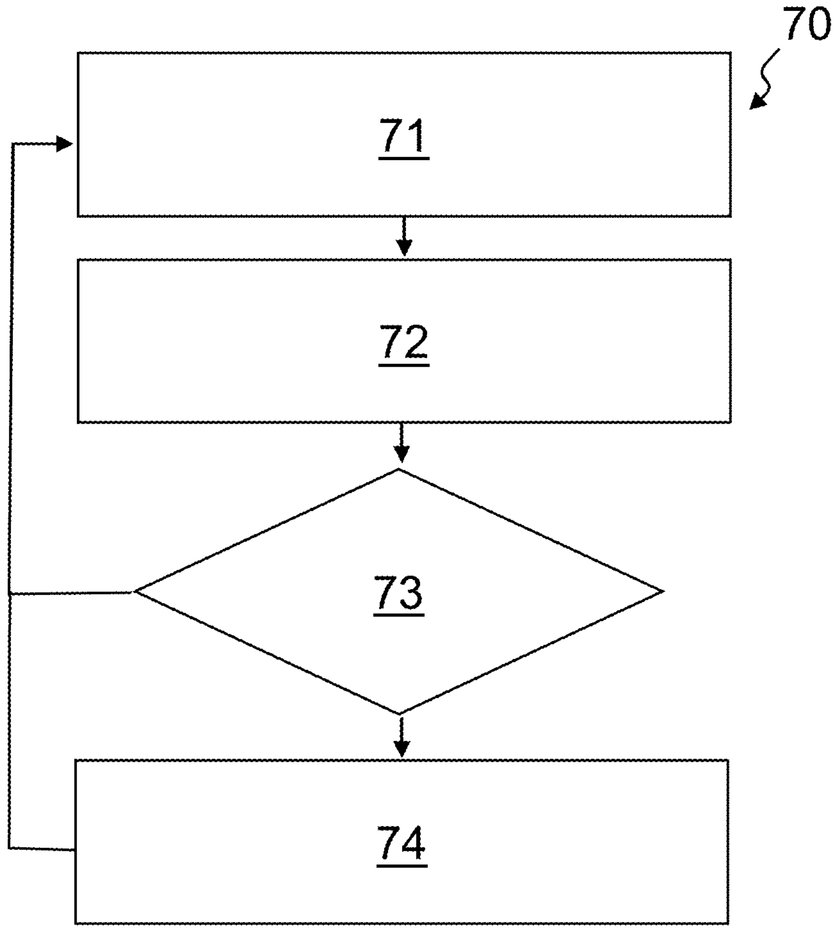
FIG. 4 is a flow chart of a control method.

FIG. 4 is a flow chart of a control method 70. The control method 70 may be performed automatically by the device 20. At process block 71, the device 20 obtains the gearbox actuator position. The gearbox actuator position may be obtained continually, i.e., on an ongoing basis. The gearbox actuator position may be obtained as a function of time. The gearbox position may be obtained as a series of samples, each of which may be based on a sensor output obtained by the sensor(s) 54 and each of which may be indicative of a position of the actuator member (e.g., the pushrod 52 and/or the shift fork 53) at the respective sampling time. The sampling times may be uniformly or non-uniformly spaced in time, i.e., it is possible for the sampling time interval to vary as a function of time. The device 20 may be configured to obtain the gearbox actuator position by a pull mechanism (e.g., by actively querying the gearbox actuator) or by a push mechanism (e.g., by the gearbox actuator providing gearbox actuator positions on an ongoing basis).

At process block 72, the gearbox actuator position as a function of time is processed to determine whether there is a tooth-on-tooth situation. Processing the gearbox actuator position may include determining a time derivative (such as a discrete time derivative) or other measure of the change in gearbox actuator position as a function of time. At process block 73, it is determined whether there is a tooth-on-tooth situation. Determining that there is a tooth-on-tooth situation may include determining that the gearbox actuator position has a value different from any gear-engagement position and different from the neutral position, and determining that the gearbox actuator position does not vary significantly at that value (which may be established based on, e.g., a threshold comparison of a modulus of the gearbox actuator position). If it is determined that there is no tooth-on-tooth situation, the control method returns to process block 71 and continues obtaining the gearbox actuator position. If it is determined that there is a tooth-on-tooth situation, the control method proceeds to process block 74.

At process block 74, a corrective procedure is triggered (e.g., by the device 20) to resolve the tooth-on-tooth situation. Triggering the corrective procedure may include causing the gearbox actuator to displace the actuator member (e.g., the pushrod 52 and/or the shift fork 53) from the position at which the tooth-on-tooth situation is encountered towards (but not up to) the neutral position until the retracted position Pr is reached. Triggering the corrective procedure further includes triggering at least one rotational speed pulse 67, 68, to change the relative angle position of the gear 41 and the mating gear 42. Triggering the corrective procedure may further include causing the gearbox actuator to displace the actuator member (e.g., the pushrod 52 and/or the shift fork 53) from the retracted position Pr towards the gear-engagement position Pe. The control method 70 may return to process block 71 after the gear-engagement position Pe has been reached.

Figure 5:
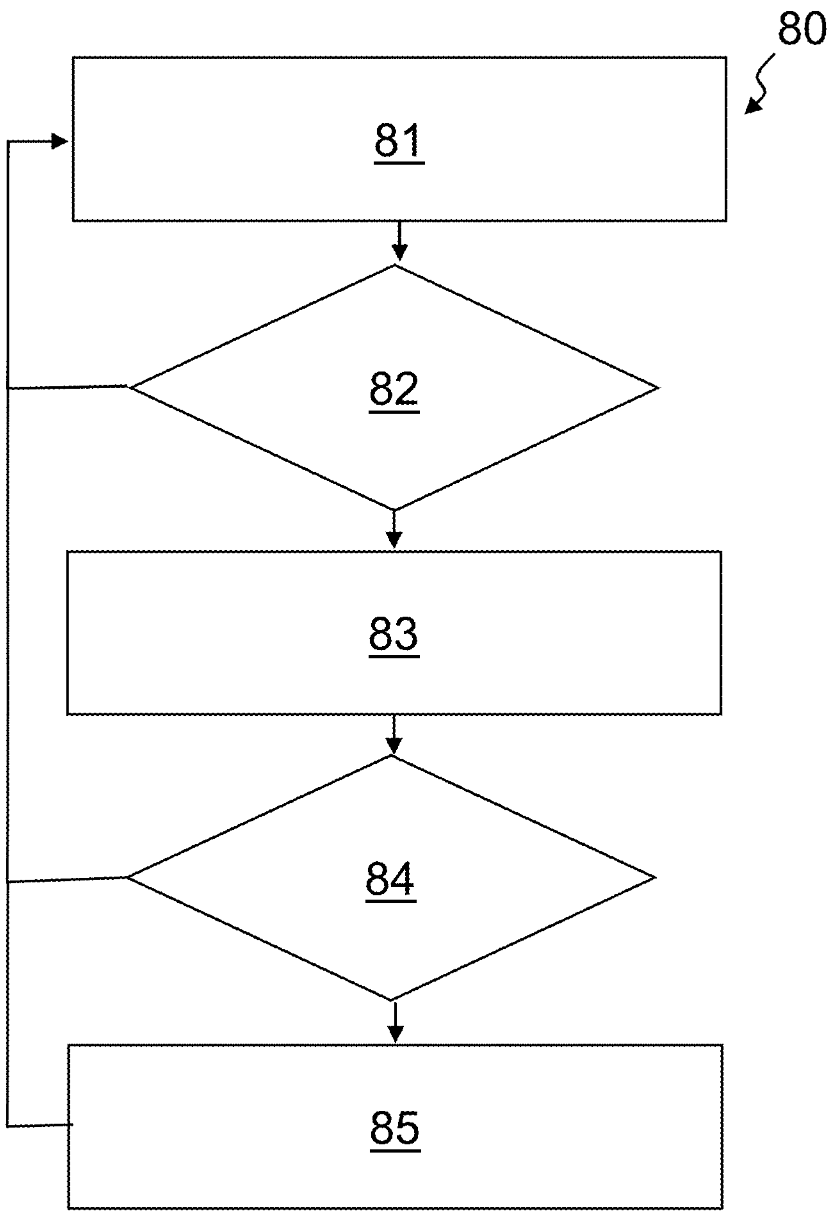
FIG. 5 is a flow chart of a control method.

FIG. 5 is a flow chart of a control method 80. The control method 80 may be performed automatically by the device 20. At process block 81, the device 20 obtains the gearbox actuator position. Process block 81 may be implemented in a same manner as disclosed in association with process block 71 of the control method 70. At process block 82, the gearbox actuator position as a function of time is processed to determine whether the gearbox actuator position is different from the neutral position and any gear-engagement position. If the gearbox actuator position is equal to the neutral position or a gear-engagement position, the method returns to process block 81 and continues obtaining additional gearbox actuator position data or signals. If the gearbox actuator position is different from the neutral position and any gear-engagement position, the control method proceeds to process block 83. At process block 83, a time derivative (such as a discrete time derivative) or other measure of the change in gearbox actuator position as a function of time is determined. At process block 84, it is determined whether the time derivative (or other measure for the variation of the gearbox actuator position) is less than or equal to a threshold. If it is determined that the time derivative (or other measure for the variation of the gearbox actuator position) is not less than or equal to the threshold, the control method returns to process block 81 and continues obtaining additional gearbox actuator position data or signals. If the gearbox actuator position has a time derivative that is less than or equal to the threshold, the method process to process block 85.

At process block 85, a corrective procedure is triggered (e.g., by the device 20) to resolve the tooth-on-tooth situation. Triggering the corrective procedure may include causing the gearbox actuator to displace the actuator member (e.g., the pushrod 52 and/or the shift fork 53) from the position at which the tooth-on-tooth situation is encountered towards (but not up to) the neutral position until the retracted position Pr is reached. Triggering the corrective procedure further includes triggering at least one rotational speed pulse 67, 68, to change the relative angle position of the gear 41 and the mating gear 42. Triggering the corrective procedure may further include causing the gearbox actuator to displace the actuator member (e.g., the pushrod 52 and/or the shift fork 53) from the retracted position Pr towards the gear-engagement position Pe. The control method 80 may return to process block 81 after the gear-engagement position Pe has been reached.

Figure 6:
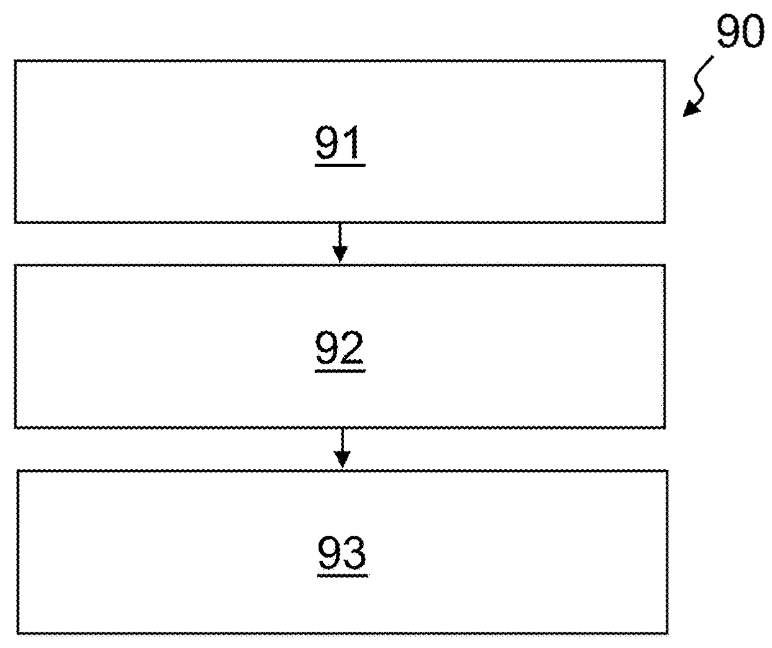
FIG. 6 is a flow chart of a corrective procedure of the control method.

FIG. 6 is a flow chart of a corrective procedure 90. The corrective procedure 90 may be performed automatically by the device 20. The corrective procedure 90 may be performed at process block 74 of the control method 70 or at process block 85 of the control method 80. At process block 91, the gearbox actuator is caused to displace the actuator member (e.g., the pushrod 52 and/or the shift fork 53) from the position at which the tooth-on-tooth situation is encountered towards (but not up to) the neutral position until the retracted position Pr is reached. At process block 92, a rotational speed pulse 67, 68 is triggered, to change the relative angle position of the gear 41 and the mating gear 42. At process block 93, the gearbox actuator is caused to displace the actuator member (e.g., the pushrod 52 and/or the shift fork 53) from the retracted position Pr towards the gear-engagement position Pe.

Figure 7:
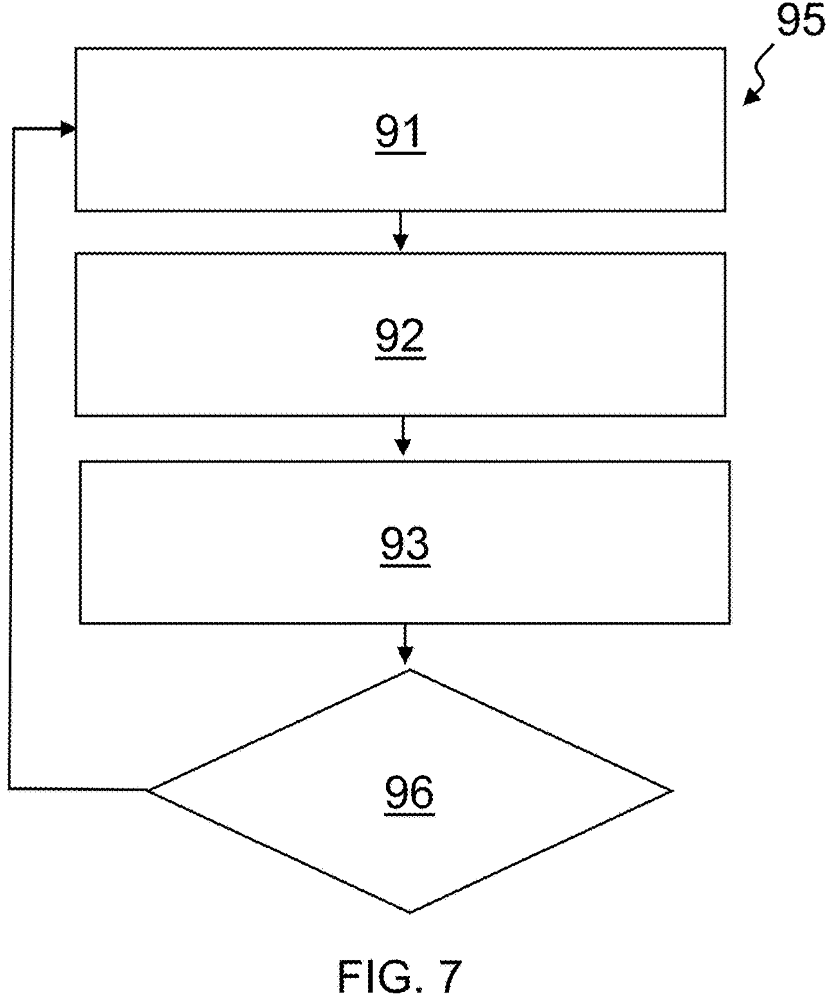
FIG. 7 is a flow chart of a corrective procedure of the control method.

FIG. 7 is a flow chart of a corrective procedure 95. The corrective procedure 95 may be performed automatically by the device 20. The corrective procedure 95 may be performed at process block 74 of the control method 70 or at process block 85 of the control method 80. Process blocks 91, 92, and 93 may be implemented as described in association with the corrective procedure 90. At process block 96, it is determined whether the gearbox actuator position has a value indicating that the gear-engagement position Pe has been reached. If it is determined, based on the gearbox actuator position, that the gear-engagement position Pe has not been reached, the method returns to process block 91. Thus, the operations of causing a displacement of the pushrod 52 and/or shift fork 53 to introduce a gap between the teeth 47, 48 of the gear 41 and of the mating gear, triggering a rotational speed pulse, and causing a further displacement of the pushrod 52 and/or shift fork 53 to re-attempt engagement may be repeated several times, as the need arises. If it is determined, at process block 96, that the gear engagement position has been reached, the corrective procedure terminates. Monitoring and processing of the gearbox actuator position may be continued. Process block 96 may also include determining whether another termination criterion (such as a maximum number of attempts) has been reached, in which case the procedure of automatically attempting a resolution of the tooth-on-tooth situation may be terminated and the pushrod 52 may be caused to return to its neutral position.

Information on the tooth-on-tooth situation and, more specifically, information on the gearbox actuator position(s) identified to correspond to a tooth-on-tooth situation may be stored in the storage system 23. The tooth-on-tooth situation detection may subsequently be performed based on the gearbox actuator position(s) previously identified to correspond to a tooth-on-tooth situation and based on the gearbox actuator positions that are continually obtained from the gearbox actuator 50, as will be described in more detail with reference to FIG. 8.

Figures 8, 9:
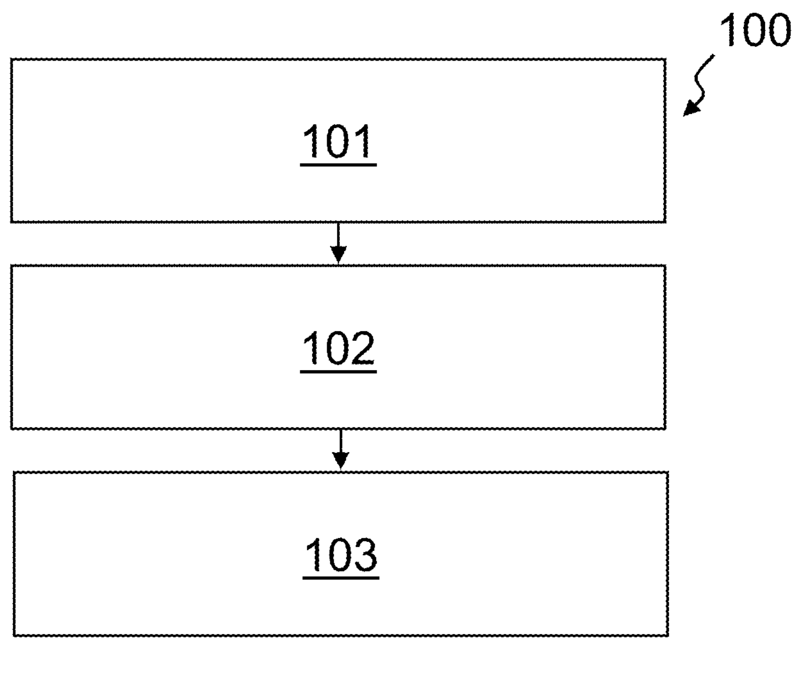
FIG. 8 is a flow chart of a control method.
FIG. 9 is a schematic representation of a force in the gearbox actuator as a function of time.

FIG. 8 is a flow chart of a method 100. The method 100 may be performed automatically by the device 20. At process block 101, the device 20 processes gearbox actuator position data and determines (using, e.g., any of the techniques described with reference to FIG. 1, FIG. 2, FIG. 3, FIG. 4 and FIG. 5) that the gearbox actuator position corresponds to a tooth-on-tooth situation. This may be determined based on the gearbox actuator position remaining substantially invariant at a value that does not correspond to any gear-engagement position Pe and that does not correspond to the neutral position Pn. At process block 102, the device 20 stores the value of the gearbox actuator position that was determined to correspond to the tooth-on-tooth situation. At process block 103, the device 20 retrieves the stored value and uses the stored value in combination with the gearbox actuator position data that is continually obtained from the gearbox actuator 50. The stored value may be used in various ways. For illustration, responsive to determining that the gearbox actuator position remains substantially invariant at a further value that does not correspond to any gear-engagement position Pe and that does not correspond to the neutral position Pn, the at least one processing circuit 30 of the device 20 may compare the further value with the stored value to ensure that there is indeed a tooth-on-tooth situation. For further illustration, responsive to determining that the gearbox actuator position reaches the stored value, the at least one processing circuit 30 of the device 20 may monitor only one or a few additional samples of the gearbox actuator position to check whether the gearbox actuator position changes, and may thereby reduce the time required to identify the tooth-on-tooth situation.

Additional measurements and/or control data may be used by the device 20 and the control method to ascertain whether there is a tooth-on-tooth situation and/or to determine a timing of the various operations performed during the corrective procedure 74, 85, 90, 95. For illustration, the further displacement of the pushrod 52 to re-attempt engagement of the gear 41 and the mating gear 42 may be performed in dependence on the first rotational speed 65 and the second rotational speed 66. The further displacement of the pushrod 52 to re-attempt engagement of the gear 41 and the mating gear 42 may be triggered at a time at which the first rotational speed 65 and the second rotational speed 66 are substantially equal, e.g., at which a difference between the two rotational speeds is less than a rotational speed threshold. For still further illustration, the device 20 and control method may take into account additional measurements such as force measurements obtainable from the gearbox actuator 50.

FIG. 9 illustrates a force measured by the gearbox actuator 50 (e.g., as a force acting on the pushrod 52) as a function of time. The force (shown along force axis 110) is shown as a function of time along the time axis 111. The force 112 varies from a first force level F1 to a second force level F2 when the tooth-on-tooth situation is encountered (i.e., between the first time T1 and the second time T2). The device 20 and control method may process the force in association with the gearbox actuator position to verify that there is indeed a tooth-on-tooth situation.

Figure 10:
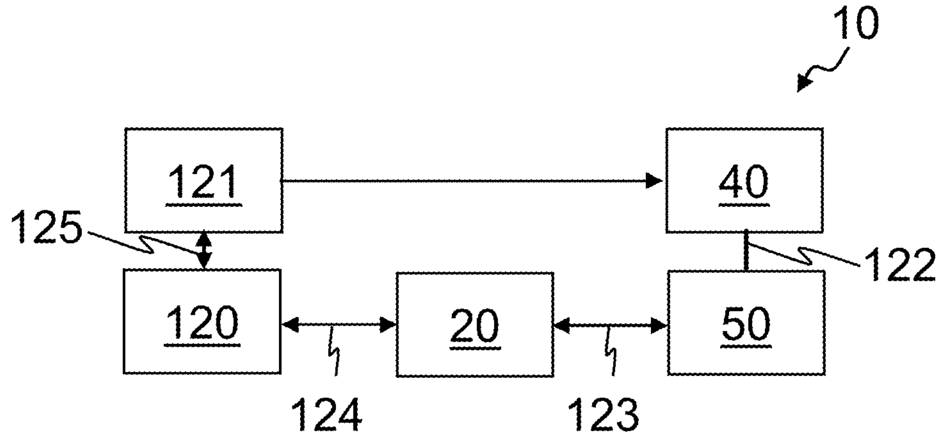
FIG. 10 is a schematic representation of a vehicle transmission system including a device according to an embodiment.
Figure 11:
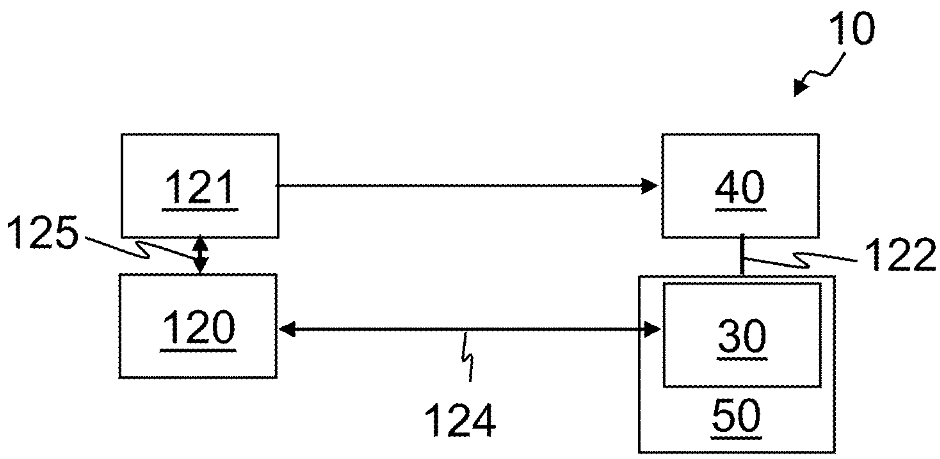
FIG. 11 is a schematic representation of a vehicle transmission system including a device according to an embodiment.
Figure 12:
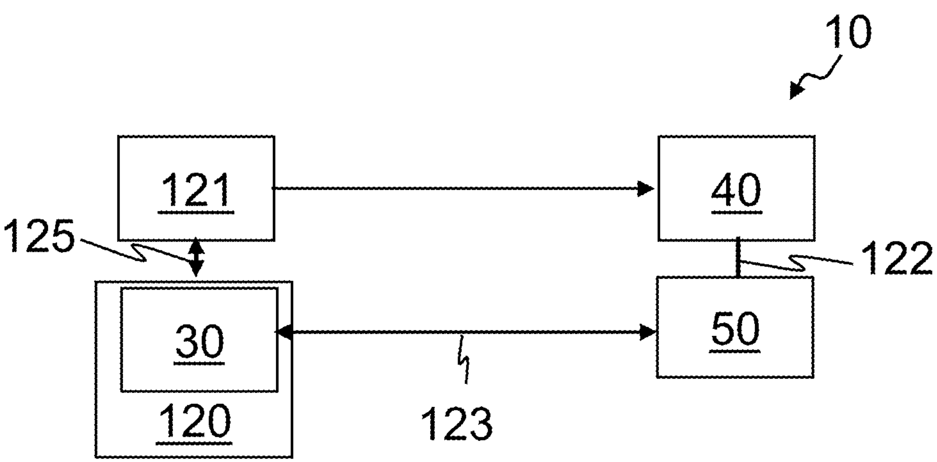
FIG. 12 is a schematic representation of a vehicle transmission system including a device according to an embodiment.

FIG. 10, FIG. 11, and FIG. 12 show schematic representations of a vehicle transmission system 10. The vehicle transmission system 10 includes the gearbox 40, the gearbox actuator 50, and an engine 121 coupled to or configured to be coupled to the input shaft 45 of the gearbox 40. The vehicle transmission system 10 further includes a motor control unit 120 configured to control the engine 121 and to obtain speed and/or torque measurements from the engine 121. The gearbox actuator 50 is coupled to the transmission via a mechanical coupling 122, which may include one or several pushrod(s) and/or shift fork(s).

FIG. 10 shows the vehicle transmission system 10 including the device 20 implemented as an ECU separate from the motor control unit 120. The device 20 may be configured to communicatively interface with the gearbox actuator 50 over a data or signal connection 123, which may be implemented as a point-to-point connection or a bus, without being limited thereto. The device 20 may be configured to perform bi-directional communication over the data or signal connection 123, to retrieve the gearbox actuator position from the gearbox actuator 50 and to provide commands to the gearbox actuator 50 that cause the pushrod 52 and/or the shift fork 53 to be displaced. The device 20 may be configured to communicatively interface with the motor control unit 120 via a second data or signal connection 124, which may be implemented as a point-to-point connection or a bus, without being limited thereto. The device 20 may be configured to perform bi-directional communication over the second data or signal connection 124, to provide commands to the motor control unit 120 that cause the one or several rotational speed pulses 68, 69 and/or to obtain speed measurements from the motor control unit 120. The motor control unit 120 may be configured to communicatively interface with the engine 121, either directly or via an intermediate ECU, over a third data or signal connection 125. The motor control unit 120 may be configured for bi-directional communication over the third data or signal connection 125 to obtain rotational speed measurements (such as measurements of a rotational speed of the input shaft of the gearbox and/or of a rotational speed of an output shaft of the gearbox) and to control an intermittent rotational speed increase during the one or several rotational speed pulses 67, 68.

FIG. 11 shows the vehicle transmission system 10 in which the at least one processing circuit 30 is integrated into a housing of the gearbox actuator 50. The at least one processing circuit 30 may in this case interface with the sensor(s) 54 of the gearbox actuator 50. FIG. 12 shows the vehicle transmission system 10 in which the at least one processing circuit 30 is integrated into the motor control unit 120. Other implementations may be made in still further embodiments, e.g., with the device 20 being a dedicated ECU provided for resolving the tooth-on-tooth situation or being integral with other control and/or monitoring electronics.

Figure 13:
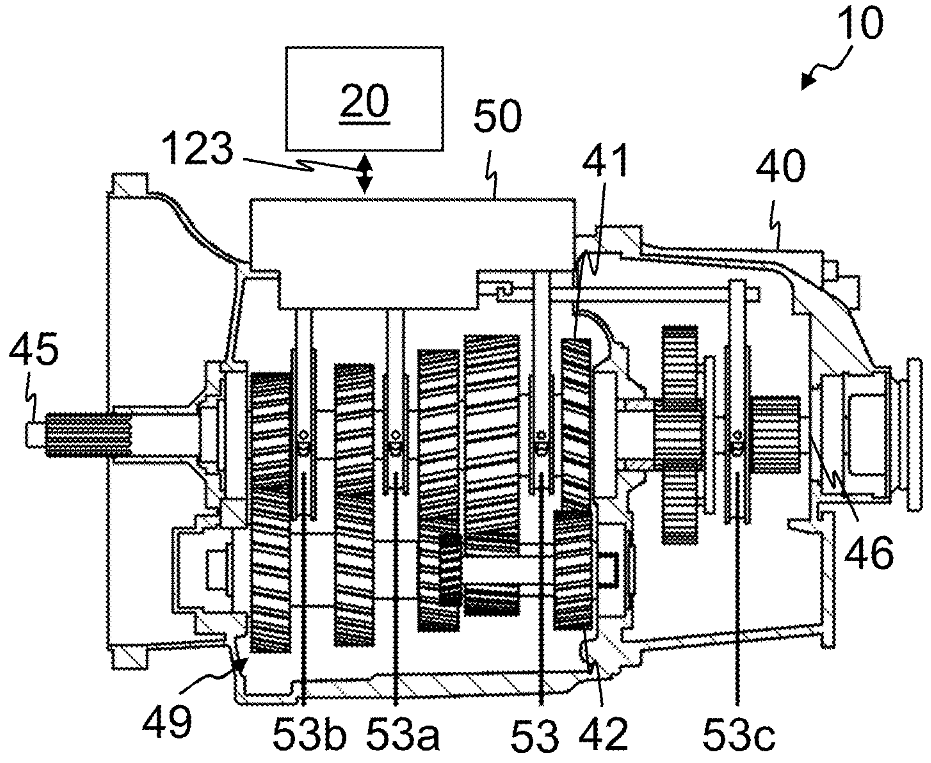
FIG. 13 is a schematic representation of a vehicle transmission system including a device according to an embodiment.

FIG. 13 shows a partial, partially broken-away view of a vehicle transmission system including the gearbox 40, the gearbox actuator 50, and the device 20 configured to communicatively interface with the gearbox actuator 50. The gearbox 40 may be a non-synchronized gearbox 40, i.e., a gearbox 40 that does not have any synchronizers. The gearbox actuator 50 may include one or several shift fork(s) other than the shift fork 53, such as a second shift fork 53*a*, a third shift fork 53*b*, and/or a fourth shift fork 53*c*. The gearbox 40 includes a gear set 49 that includes the gear 41 and the mating gear 42. The additional shift forks 53*a*, 53*b*, 53*c* may be operatively associated with gears of the gear set other than the gear 41 and the mating gear 42. The gearbox actuator 50 may be configured to provide gearbox actuator position data for the shift fork 53. The gearbox actuator 50 may be configured to provide gearbox actuator position data optionally also for one, several, or all of the additional shift forks 53*a*, 53*b*, 53*c*. The device 20 may be configured to detect a tooth-on-tooth situation for the gear 41 and the mating gear 42. The device 20 may be configured to optionally detect a tooth-on-tooth situation also for additional gears that are associated with second shift fork 53*a*, the third shift fork 53*b*, or the fourth shift fork 53*d*. The device 20 may be configured to perform processing operations as already discussed herein to detect a tooth-on-tooth situation and to trigger a corrective procedure to resolve the tooth-on-tooth situation.

Figure 14:
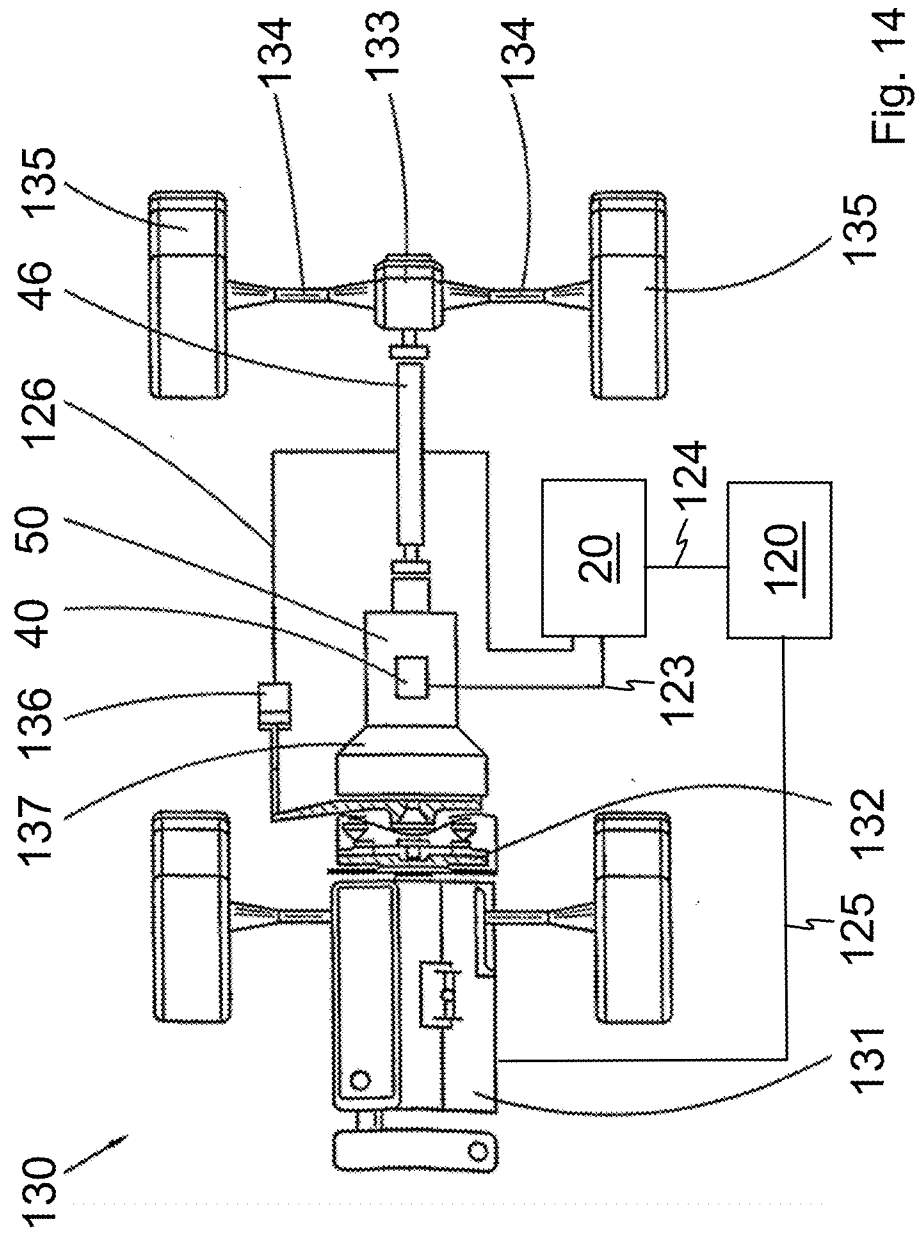
FIG. 14 is a schematic representation of a commercial vehicle according to an embodiment.

FIG. 14 shows a schematic representation of a motor vehicle 130, which may be a commercial vehicle. The motor vehicle 130 includes an engine 131 coupled to the gearbox 40 through a friction clutch 132. The gearbox 40 may be a non-synchronized gearbox 40, i.e., a gearbox 40 that does not have any synchronizers. The gearbox 40 is connected with a differential 133 through the output shaft 46, which drives a motor vehicle wheel 135 through one half axle 134 each. The friction clutch 132 is activated by an actuator 136 which is connected to a control unit (such as the device 20 or an ECU or control device separate therefrom) through a fourth data or signal connection 126. The gearbox 40 is configured to be actuated by the gearbox actuator 50. The gearbox actuator 50 may be arranged on or at a housing 137 of the gearbox 40. The gearbox actuator 50 may be connected with the device 20 via the third signal or data connection 123. The device 20 is configured to detect and resolve a tooth-on-tooth situation.

Machine-readable instructions may be distributed to one or several vehicles to perform the control method according to an aspect or embodiment.

Figure 15:
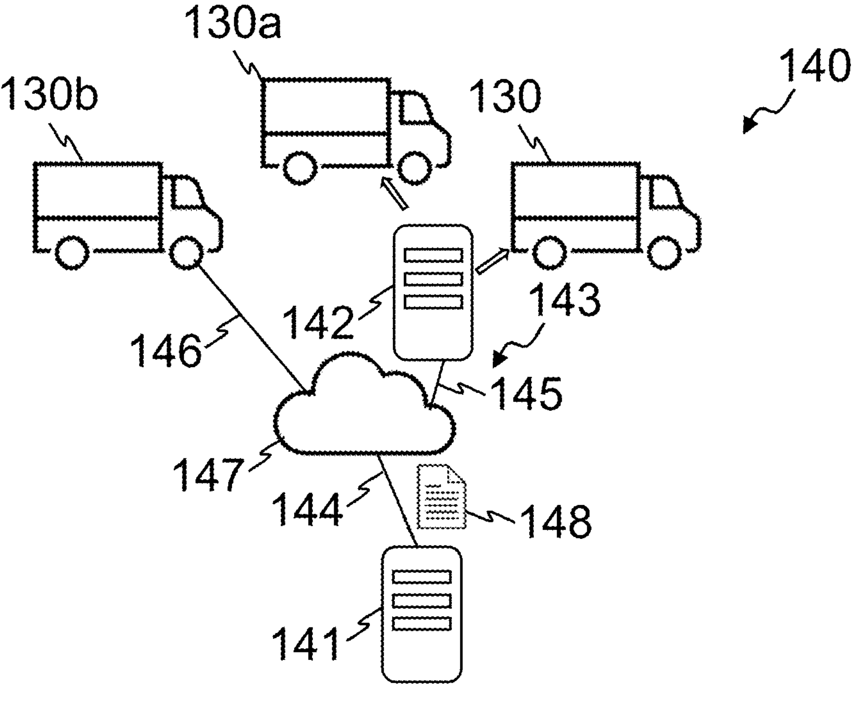
FIG. 15 is a schematic representation of a system including several vehicles according to an embodiment.

FIG. 15 is a schematic representation of a system 140 configured to distribute machine-readable instruction code 148 to a plurality of vehicles 130, 130*a*, 130*b*, each including a non-synchronized transmission and a gearbox actuator configured to perform gear shift operations. Each of the vehicle 130, 130*a*, 130*b* respectively includes at least one programmable processing circuit (such as a programmable processor or a programmable controller) configured to execute the machine-readable instruction code 148 to perform the control method according to an aspect or embodiment. The system 140 includes an instruction code distribution server 141 configured to provide the machine-readable instruction code 148 via a communication system 143 to the vehicles 130, 130*a*, 130*b* for execution. The communication system 143 may include a wide area network (WAN) 147 and/or a cellular network, to which the instruction code distribution server 141 is connected via a communication link 144. The system 140 may include a manufacturer server 142, which may be maintained at a commercial vehicle manufacturing site and/or at a repair station. The manufacturer server 142 may be configured to provide the machine-readable instruction code for execution to at least programmable processing circuit of several vehicles 130, 130*a*. The manufacturer server 142 may be configured to communicatively interface with the instruction code distribution server 141 via a further communication link 145 connecting the manufacturer server 142 to the WAN 147. The manufacturer server 142 may be configured to provide the machine-readable instruction code for execution to at least programmable processing circuit of several vehicles 130, 130*a* in various ways, such as by wired connections or by uploading the machine-readable instruction code onto a vehicle component that is subsequently installed in the vehicle 130 or the further vehicle 130*a*. The vehicles may optionally include one or several other vehicle (s) 130*b* configured to communicatively interface, via another communication link 146, with the instruction code distribution server 141. The other vehicle 130*b* may be configured to receive the machine-readable instruction code 148, for example over a wireless interface, for execution by the vehicle 130*b*.

While embodiments have been described with reference to the drawings, modifications and alterations may be implemented in other embodiments. For illustration, while embodiments have been described in association with the identification of a tooth-on-tooth situation based on a position of a pushrod or based on the position of a shift fork, the device 20 and control method may also be operative to process gearbox actuator position data indicative of a position of an actuator member different from the pushrod or the shift fork. For still further illustration, while embodiments have been described in which the rising flank and the falling flank of a rotational speed pulse may have same or comparable durations, the time durations of the rising flank and of the falling flank of a rotational speed pulse may be different. For illustration, the rising flank may have a duration shorter than the falling flank.

Various effects and advantages are attained by embodiments of the present disclosure. Embodiments assist a driver with resolving a tooth-on-tooth situation, thereby facilitating safe operation of a vehicle and reducing driver distraction.

LIST OF REFERENCE NUMERALS (PART OF THE DESCRIPTION)

10 vehicle system
16 gearbox actuator position
17 speed-pulse triggering output
18 retraction triggering output
19 re-engagement attempt triggering output
20 device for a vehicle
21 interface
22 further interface
23 storage system
30 processing circuit(s)
31 gearbox actuator position processing
32 tooth-on-tooth detection
35 corrective procedure triggering
36 output generation
40 gearbox
41 gear
42 mating gear
43 first shaft
44 second shaft
45 input shaft
46 output shaft
47 gear tooth
48 mating gear tooth
49 gear set
50 gearbox actuator
51 displacement mechanism
52 pushrod
53 shift fork
53*a* second shift fork
53*b* third shift fork
53*c* third shift fork
54 sensor(s)
55 interface
56 line
60 gearbox actuator position axis
61 time axis
62 gearbox actuator position as function of time
63 time interval
63' variation threshold range
64 rotational speed axis
65 first rotational speed
66 second rotational speed
67 rotational speed pulse
68 further rotational speed pulse
69 rising flank
69' falling flank
70 method
71-74 process block
80 method
81-85 process block

90 method
91-93 process block
95 method
96 process block
100 method
101-103 process block
110 force axis
111 time axis
112 time-dependent force
120 motor control unit
121 engine
122 mechanical coupling
123 data or signal connection
124 second data or signal connection
125 third data or signal connection
126 fourth data or signal connection
130 vehicle
130*a* further vehicle
130*b* other vehicle
131 engine
132 friction clutch
133 differential
134 half axle
135 vehicle wheel
136 actuator
137 housing
140 system
141 instruction code distribution server(s)
142 manufacturer server
143 communication system
144 communication link
145 further communication link
146 other communication link
147 wide area network
148 instruction code
F1 first force level
F2 second force level
Pe gear engagement position
Pn neutral position
Pr retracted position
PTT tooth-on-tooth position
T1 first time
T2 second time
T3 third time

What is claimed is:

1. A control method for a vehicle (130; 130, 130*a*, 130*b*), comprising:

obtaining, by at least one processing circuit (30), a gearbox actuator position (62) indicative of a position of an actuator member (52, 53; 53, 53*a*, 53*b*, 53*c*) of a gearbox actuator (50), wherein the actuator member (52, 53; 53, 53*a*, 53*b*, 53*c*) is displaceable to bring a gear (41) of a gearbox (40) into engagement with a mating gear (42) of the gearbox (40);

processing, by the at least one processing circuit (30), the gearbox actuator position (62) to detect a tooth-on-tooth situation preventing engagement between the gear (41) and the mating gear (42); and triggering, by the at least one processing circuit (30), a corrective procedure to resolve the tooth-on-tooth situation, the corrective procedure comprising triggering, by the at least one processing circuit (30), a rotational speed pulse (67, 68) or several rotational speed pulses (67, 68) for an input shaft (45) of the gearbox (40) to resolve the tooth-on-tooth situation;

wherein the rotational speed pulse is defined as a change in rotational speed of the input shaft that is deliberately and controllably introduced by the at least one processing circuit, wherein the rotational speed pulse includes a rising flank in which the rotational speed is increased and a falling flank in which the rotational speed is decreased, wherein the rising flank and the falling flank are matched to each other such that the increase during the rising flank is equal in magnitude to the decrease during the falling flank, such that the rotational speed at an end of the rotational speed pulse is the same as the rotational speed at a start of the rotational speed pulse.

2. The control method of claim 1, wherein the actuator member (52, 53; 53, 53*a*, 53*b*, 53*c*) has a gear engagement position (Pe) and a neutral position (Pn), and wherein the corrective procedure resolves the tooth-on-tooth situation without return of the actuator member (52, 53; 53, 53*a*, 53*b*, 53*c*) to the neutral position (Pn).

3. The control method of claim 1, wherein the corrective procedure further comprises triggering, by the at least one processing circuit (30), a displacement of the actuator member (52, 53; 53, 53*a*, 53*b*, 53*c*) in a direction away from a gear engagement position to temporarily increase a spacing between the gear (41) and the mating gear (42) during the rotational speed pulse (67, 68) or during the several rotational speed pulses (67, 68).

4. The control method of claim 3, wherein triggering the displacement of the actuator member (52, 53; 53, 53*a*, 53*b*, 53*c*) comprises communicatively interfacing, by the at least one processing circuit (30), with the gearbox actuator (50) to temporarily increase the spacing between the gear and the mating gear (42).

5. The control method of claim 3, wherein the corrective procedure further comprises triggering, by the at least one processing circuit (30), a further displacement of the actuator member (52, 53; 53, 53*a*, 53*b*, 53*c*) in a direction toward a gear engagement position to decrease the spacing between the gear (41) and the mating gear (42) to re-attempt engaging the gear with the mating gear (42).

6. The control method of claim 5, wherein the corrective procedure further comprises synchronizing, by the at least one processing circuit (30), the further displacement with a pulse end at which the rotational speed pulse (67, 68) or one of the several rotational speed pulses (67, 68) terminates.

7. The control method of claim 1, further comprising:

obtaining, by the at least one processing circuit (30), a first rotational speed (65) that is equal to or dependent on an input shaft rotational speed of the input shaft (45), and a second rotational speed (66) that is equal to or dependent on an output shaft rotational speed of an output shaft (46), wherein the at least one processing circuit (30) obtains the first rotational speed (65) as function of time, and wherein the at least one processing circuit (30) obtains the second rotational speed (66) as function of time, and wherein the corrective procedure is further performed based on a comparison of the first rotational speed (65) and the second rotational speed (66).

8. The control method of claim 5, wherein the corrective procedure further comprises synchronizing, by the at least one processing circuit (30), the further displacement with a pulse end at which the rotational speed pulse (67, 68) or one of the several rotational speed pulses (67, 68) terminates, wherein the method further comprises obtaining, by the at least one processing circuit (30), a first rotational speed (65) that is equal to or dependent on an input shaft rotational speed of the input shaft (45), and a second rotational speed (66) that is equal to or dependent on an output shaft rotational speed of an output shaft (46), wherein the at least one processing circuit (30) obtains the first rotational speed (65) as function of time, and wherein the at least one processing circuit (30) obtains the second rotational speed (66) as function of time, and wherein the corrective procedure is further performed based on a comparison of the first rotational speed (65) and the second rotational speed (66), wherein the at least one processing circuit (30) determines a trigger time for triggering the further displacement based on the first rotational speed (65) and the second rotational speed (66).

9. The control method of claim 1, wherein obtaining the gearbox actuator position (62) comprises obtaining the gearbox actuator position (62) as a function of time, and wherein processing the gearbox actuator position (62) comprises evaluating, by the at least one processing circuit (30), both a magnitude of the gearbox actuator position (62) and a time-dependent variation of the gearbox actuator position (62) to detect the tooth-on-tooth situation and/or learn which gearbox actuator position (62) corresponds to the tooth-on-tooth situation.

10. The method of claim 1, wherein the actuator member (52, 53; 53, 53*a*, 53*b*, 53*c*) comprises a pushrod (52) or a shift fork (53; 53, 53*a*, 53*b*, 53*c*), and/or wherein the processing circuit (30) comprises a processing circuit (30) of an electronic control unit (20) or of a motor control unit (120) of the vehicle (130; 130, 130*a*, 130*b*).

11. The method of claim 1, wherein the gearbox (40) is a non-synchronized gearbox (40).

12. The method of claim 1, wherein the rotational speed pulse comprises increasing the rotational speed (65) of the input shaft, followed by decreasing the rotational speed of the input shaft, wherein the increase in the rotational speed corresponds to the following decrease in the rotational speed, such that the rotational speed following the speed pulse is the same as before the speed pulse.

13. The method of claim 1, wherein the tooth-on-tooth situation is determined in response to detecting that an actuator position is within a threshold position range over a time interval, wherein the threshold position is short of an engaged position of the gear and the mating gear.

14. The method of claim 13, wherein the position of the actuator in the tooth-on-tooth situation is not predetermined and known, wherein the position of the actuator in tooth-on-tooth situation is determined and stored in response to determining the tooth-on-tooth situation.

15. The method of claim 13, wherein the corrective procedure is performed multiple times in response to repeatedly detecting a tooth-on-tooth situation.

16. The method of claim 15, wherein the corrective procedure is stopped in response to exceeding a threshold number of tooth-on-tooth detections without reaching an engaged position between the gear and the mating gear.

17. A non-transitory computer-readable medium having machine-readable instruction code (148) stored thereon comprising instructions which, upon execution by a programmable processing circuit (30), cause the programmable processing circuit (30) to perform the method of claim 1.

18. A device (20) for a vehicle (130; 130, 130*a*, 130*b*), comprising:

at least one processing circuit (30) configured to obtain a gearbox actuator position (62) indicative of a position of an actuator member (52, 53; 53, 53*a*, 53*b*, 53*c*) of a gearbox actuator (50), the actuator member (52, 53; 53, 53*a*, 53*b*, 53*c*) being displaceable to bring a gear (41) of a gearbox (40) into engagement with a mating gear (42) of the gearbox (40);

process the gearbox actuator position (62) to detect a tooth-on-tooth situation preventing engagement of the gear (41) and the mating gear (42); and trigger a corrective procedure to resolve the tooth-on-tooth situation, the corrective procedure comprising a rotational speed pulse (67, 68) or several rotational speed pulses (67, 68) for an input shaft (45) of the gearbox (40) to resolve the tooth-on-tooth situation;

wherein the rotational speed pulse is defined as a change in rotational speed of the input shaft that is deliberately and controllably introduced by the at least one processing circuit, wherein the rotational speed pulse includes a rising flank in which the rotational speed is increased and a falling flank in which the rotational speed is decreased, wherein the rising flank and the falling flank are matched to each other such that the increase during the rising flank is equal in magnitude to the decrease during the falling flank, such that the rotational speed at an end of the rotational speed pulse is the same as the rotational speed at a start of the rotational speed pulse.

19. A vehicle transmission system (20, 40, 50), comprising:

a gearbox (40) comprising a gear (41) and a mating gear (42);

a gearbox actuator (50) comprising an actuator member (52, 53; 53, 53*a*, 53*b*, 53*c*) displaceable to bring the gear (41) into engagement with the mating gear (42); and the device (20) of claim 18.

20. A vehicle (130; 130, 130*a*, 130*b*), comprising:

the vehicle transmission system (20, 40, 50) of claim 19 and an engine (121) configured to be coupled to the input shaft (45) of the gearbox (40).

* * * * *